US007484864B2

(12) United States Patent
Okada

(10) Patent No.: US 7,484,864 B2
(45) Date of Patent: Feb. 3, 2009

(54) VEHICLE HEADLAMP

(75) Inventor: Noriko Okada, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/849,468

(22) Filed: Sep. 4, 2007

(65) Prior Publication Data

US 2008/0055919 A1 Mar. 6, 2008

(30) Foreign Application Priority Data

Sep. 4, 2006 (JP) ............................ 2006-238583

(51) Int. Cl.
*F21V 7/00* (2006.01)
*F21V 11/00* (2006.01)
*B60Q 1/00* (2006.01)

(52) U.S. Cl. ....................... 362/300; 362/517; 362/518; 362/538; 362/539; 362/297; 362/346

(58) Field of Classification Search ................. 362/300, 362/516–519, 538, 539, 346, 247, 297
See application file for complete search history.

(56) References Cited

U.S. PATENT DOCUMENTS 1,446,891 A * 2/1923 Fay ............................ 362/291
3,079,529 A * 2/1963 Novinger ..................... 315/82
4,219,867 A * 8/1980 Zehender ..................... 362/518
6,921,188 B2 * 7/2005 Taniuchi ...................... 362/517
7,125,150 B2 * 10/2006 Brun et al. .................. 362/517
7,186,009 B2 * 3/2007 Yamamura et al. .......... 362/517
7,325,954 B2 * 2/2008 Futami ....................... 362/538
7,393,126 B2 * 7/2008 Naganawa et al. .......... 362/539
7,401,958 B2 * 7/2008 Okada ........................ 362/517

FOREIGN PATENT DOCUMENTS

JP 2001-229715 A 8/2001

* cited by examiner

*Primary Examiner*—Hargobind S Sawhney
*Assistant Examiner*—David J Makiya
(74) *Attorney, Agent, or Firm*—Sughrue Mion, PLLC

(57) ABSTRACT

A headlamp includes a light source, a first auxiliary reflector disposed below a reflector, and a plurality of second auxiliary reflectors disposed on a front side of the first auxiliary reflector at a predetermined interval along a vertical direction. The light source is a line light source extending in a width direction of a vehicle. A sectional shape of a reflecting surface of the first auxiliary reflector taken along a vertical plane that is parallel to the optical axis is a shape of a parabola having an axis line downwardly extending in the forward direction at a predetermined downward inclination angle. A sectional shape of a reflecting surface of each of the second auxiliary reflectors taken along the vertical plane has a shape of a substantially straight line downwardly extending in the forward direction at a downward inclination angle which is smaller than the predetermined downward inclination angle.

10 Claims, 6 Drawing Sheets

VEHICLE HEADLAMP

The present invention claims priority from Japanese Patent Application No. 2006-238583 filed on Sep. 4, 2006, the entire content of which is incorporated herein by reference.

FIELD OF THE INVENTION

The present invention relates to a projector-type vehicle headlamp. More specifically, the present invention relates to a vehicle headlamp which forms a low beam light distribution pattern.

DESCRIPTION OF THE RELATED ART

Generally, in a projector-type vehicle headlamp, a projection lens is disposed on an optical axis extending in a longitudinal direction of the vehicle and a light source is provided behind a rear focal point thereof, and a light emitted from the light source is reflected by a reflector close to the optical axis. In a case of a vehicle headlamp for a low beam, a part of the light reflected by the reflector is shielded to form a cutoff line of a low beam light distribution pattern by means of a shade disposed such that an upper edge is positioned at the vicinity of the rear focal point of the projection lens.

JP-A-2001-229715 discloses a projector-type vehicle headlamp in which a light source is a line light source extending in a width direction of a vehicle. Specifically, FIG. 5 of JP-A-2001-229715 shows a structure in which a first auxiliary reflector which reflects a light emitted from the light source in a downward direction and a second auxiliary reflector which reflects the light reflected by the first auxiliary reflector in a forward direction are provided separately from the reflector.

When a line light source extending the width direction of the vehicle is employed as a light source of the projector-type vehicle headlamp, it is possible to easily obtain a structure of a lamp in which a light source bulb is inserted and fixed to a reflector from a side. Consequently, the lamp can be downsized by reducing a size of the lamp in a front-and-rear direction.

Moreover, when a structure including the first and second auxiliary reflectors is employed, it is possible to increase a luminous flux utilization ratio to the light emitted from the light source, thereby maintaining a sufficient brightness of a low beam light distribution pattern.

However, in the vehicle headlamp disclosed in FIG. 5 of JP-A-2001-229715, a reflecting surface of the first auxiliary reflector is formed in a shape of an ellipsoid of revolution in which a point in the vicinity of the light source is set to be a first focal point and a point positioned therebelow is set to be a second focal point, and a reflecting surface of the second auxiliary reflector is formed in a shape of a paraboloid of revolution in which the second focal point is set to be a focal point. For this reason, there are the following problems.

More specifically, in the vehicle headlamp, a light source image formed in the second focal point of the ellipsoid of revolution is set to be a false light source to control a reflected light through the second auxiliary reflector. However, a shape of the false light source is entirely different from that of an original line light source. For this reason, there is a problem in that the control of the reflected light cannot be carried out finely.

SUMMARY OF THE INVENTION

An aspect of the invention provides a projector-type vehicle headlamp operable to form a bright low beam light distribution pattern with high precision, while reducing a size of the lamp in a front-and-rear direction direction.

According to one or more aspects of the invention, a vehicle headlamp includes:

a projection lens disposed on an optical axis extending in a longitudinal direction of a vehicle;

a light source disposed on a rear side of a rear focal point of the projection lens;

a reflector which forwardly reflects a light emitted from the light source toward the optical axis;

a shade disposed such that an upper edge of the shade is positioned in the vicinity of the optical axis near the rear focal point, wherein the shade shields a part of the light reflected by the reflector, and forms a cutoff line of a low beam light distribution pattern;

a first auxiliary reflector disposed below the reflector, and downwardly reflects the light emitted from the light source in a forward direction; and a plurality of second auxiliary reflectors disposed on a front side of the first auxiliary reflector at a predetermined interval along a vertical direction, and forwardly reflect the light reflected by the first auxiliary reflector.

The light source may be a line light source extending in a width direction of the vehicle. A sectional shape of a reflecting surface of the first auxiliary reflector taken along a vertical plane that is parallel to the optical axis is a shape of a parabola, the parabola having a focal point in the vicinity of the light source and an axis line downwardly extending in the forward direction at a predetermined downward inclination angle with respect to the optical axis. A sectional shape of a reflecting surface of each of the second auxiliary reflectors taken along the vertical plane has a shape of a substantially straight line downwardly extending in the forward direction at a downward inclination angle which is smaller than the predetermined downward inclination angle.

A specific structure of the light source is not particularly restricted as long as the light source is a line light source that extends in a width direction of a vehicle. For example, the light source may be a discharging light emitting portion of a discharge bulb or a filament of a halogen bulb. Moreover, the light source may be positioned either on the optical axis or out of the optical axis.

A sectional shape of the reflecting surface of the first auxiliary reflector taken along a vertical plane which is orthogonal to the optical axis is not particularly restricted as long as a sectional shape taken along a vertical plane which is parallel to the optical axis is a shape of a parabola having a focal point in the vicinity of the light source and an axis line downwardly extending in the forward direction at a predetermined downward inclination angle with respect to the optical axis.

A specific arrangement and the number of the second auxiliary reflectors is not particularly restricted as long as they are arranged at an interval in a vertical direction. A specific value of the downward inclination angle of the reflecting surface of the second auxiliary reflector is not particularly restricted as long as a sectional shape taken along the vertical plane which is parallel to the optical axis is a shape of an almost straight line downwardly extending in the forward direction at a downward inclination angle that is smaller than the predetermined downward inclination angle. Furthermore, a sectional shape of the second auxiliary reflectors taken along a vertical plane which is orthogonal to the optical axis is not particularly restricted.

DETAILED DESCRIPTION

Hereinafter, exemplary embodiments of the invention will be explained with reference to the drawings. The following exemplary embodiments do not limit the scope of the invention.

Figure 1:
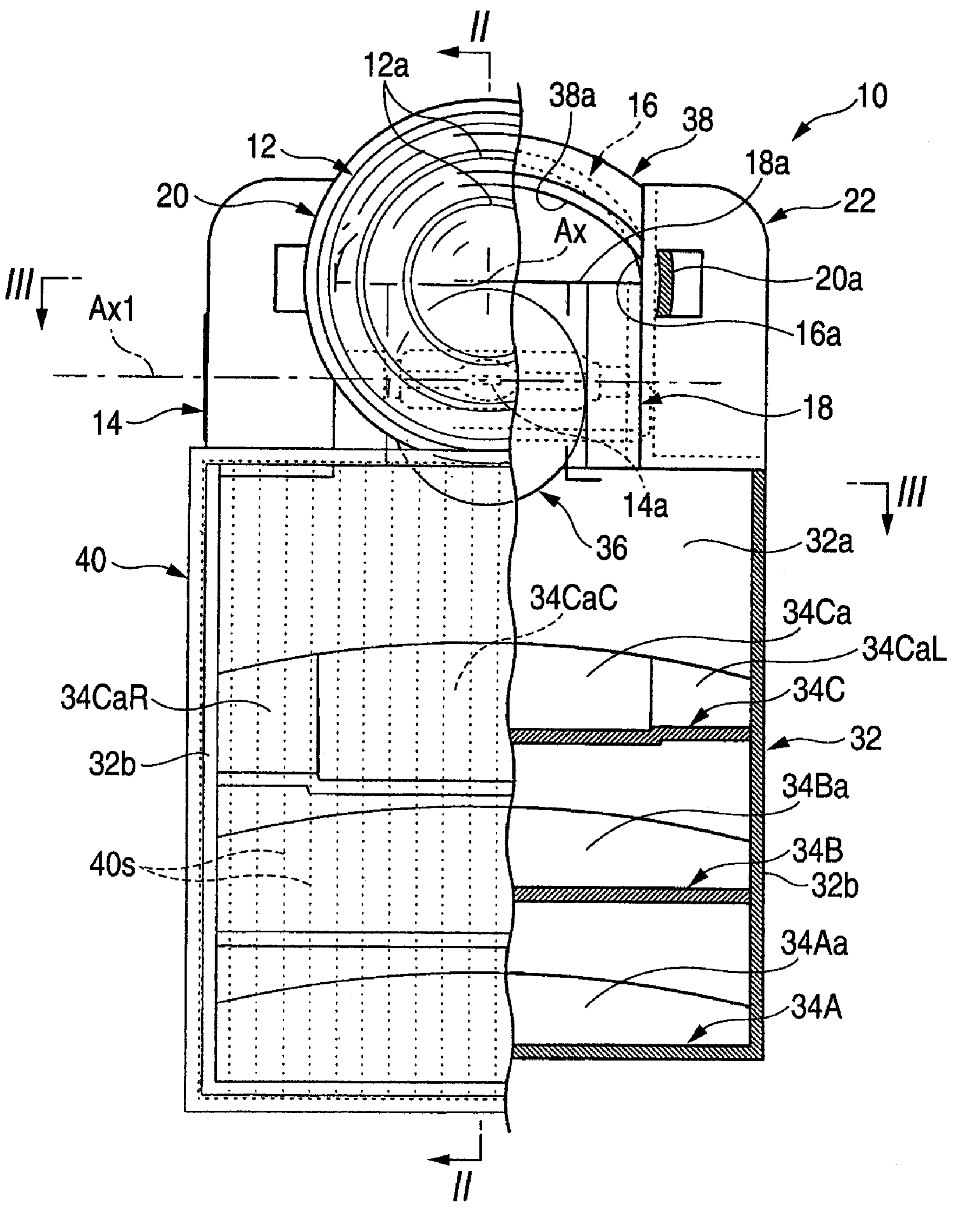
FIG. 1 is a front view showing a vehicle headlamp according to a first exemplary embodiment of the invention.
Figure 2:
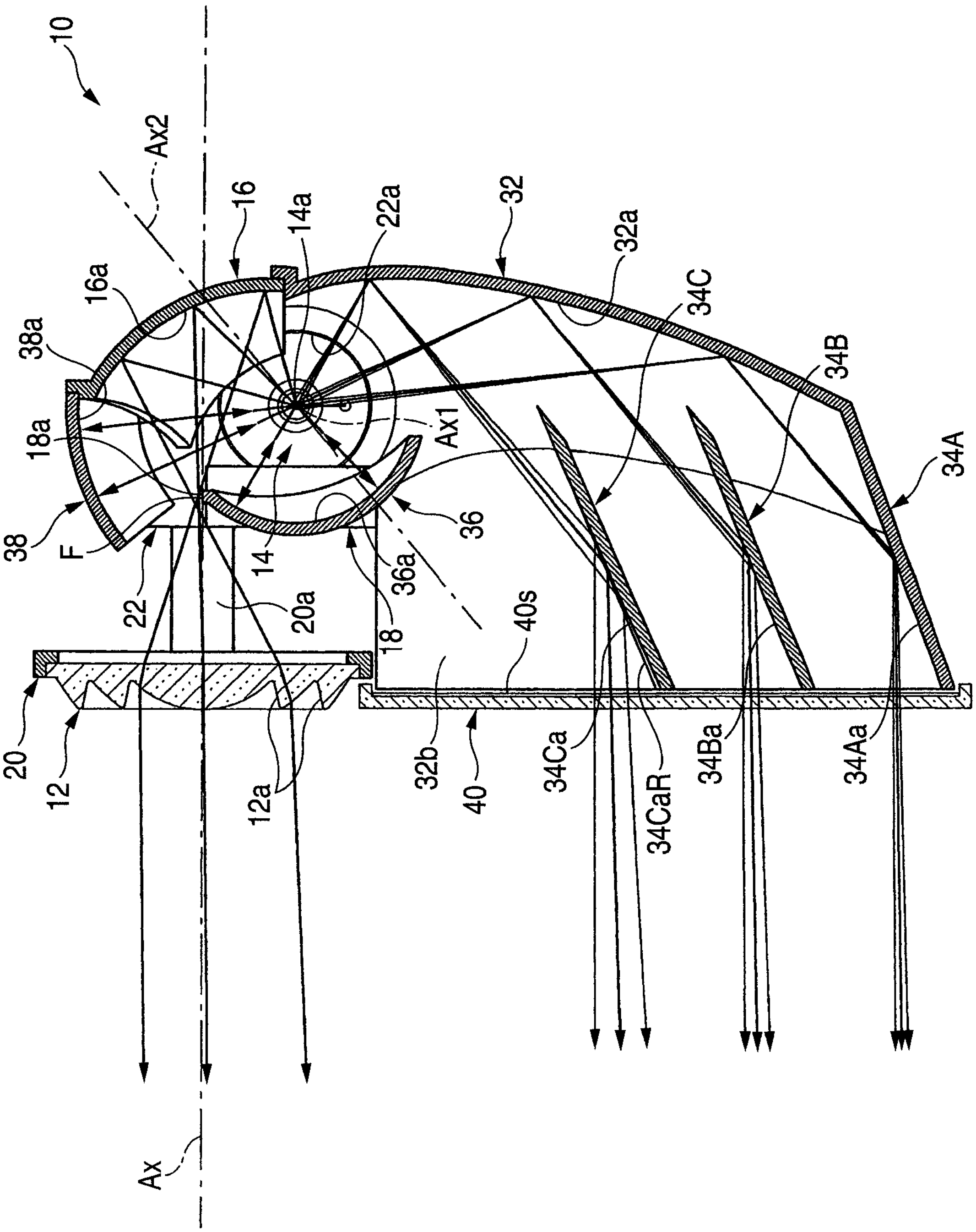
FIG. 2 is a sectional view taken along a II-II line in FIG. 1.
Figure 3:
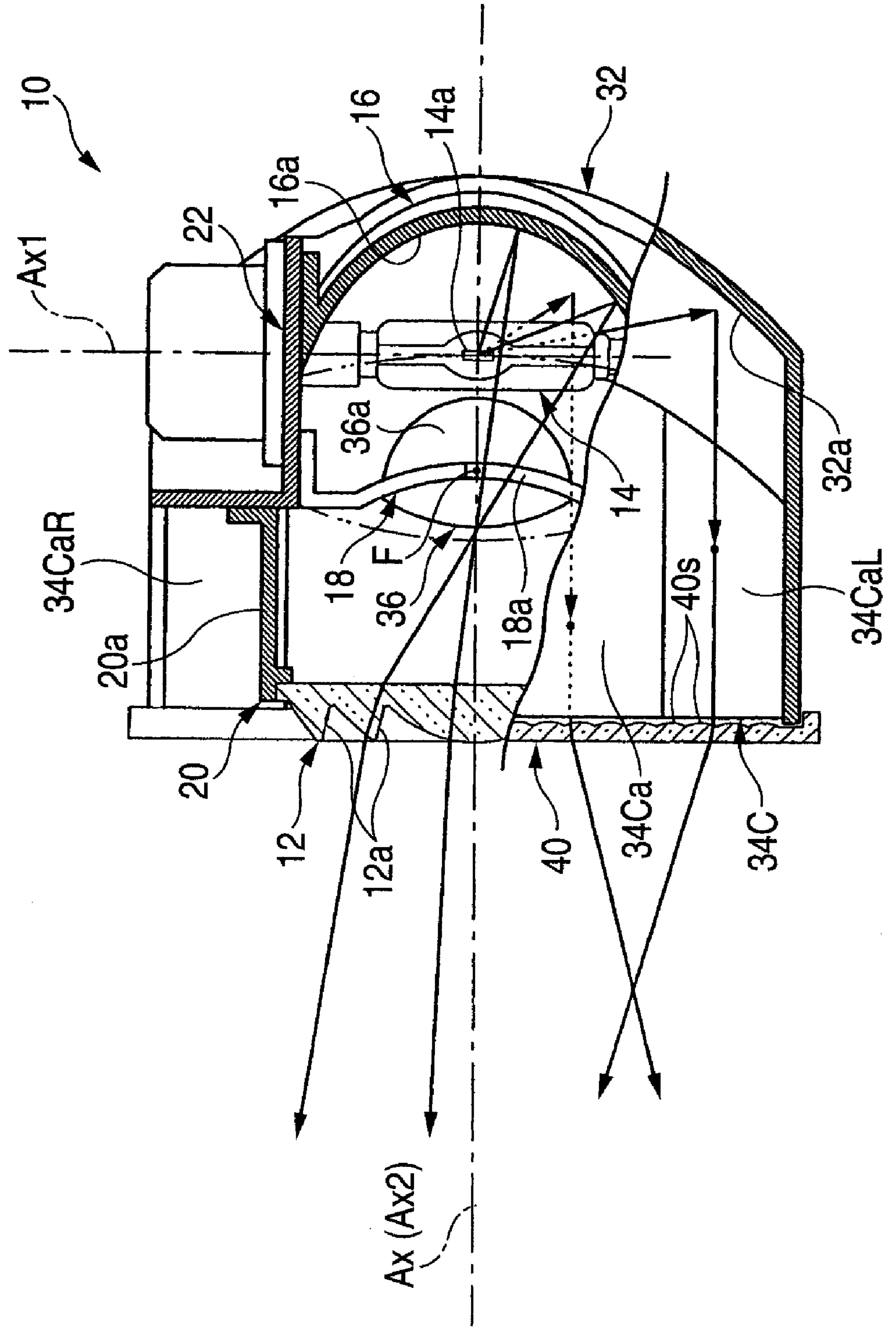
FIG. 3 is a sectional view taken along a III-III line in FIG. 1.

As shown in FIGS. 1 to 3, a vehicle headlamp 10 according to the first exemplary embodiment is of a projector-type, and irradiates a light to form a low beam light distribution pattern, and is used in an incorporating state in a lamp body (not shown) so as to freely regulate an optical axis.

The vehicle headlamp 10 includes a projection lens 12, a light source bulb 14, a reflector 16, a shade 18, a lens holder 20, a bracket 22, a first auxiliary reflector 32, a plurality of second auxiliary reflectors 34A, 34B and 34C (three in the first exemplary embodiment), a third auxiliary reflector 36, a fourth auxiliary reflector 38 and a diffusion lens 40, and has an optical axis Ax extending in a longitudinal direction of the vehicle. The vehicle headlamp 10 is disposed in a state in which the optical axis Ax is extended in a downward direction by approximately 0.5 to 0.6 degree with respect to the longitudinal direction of the vehicle in a stage in which the regulation of the optical axis is completed.

The projection lens 12 is disposed on the optical axis Ax and projects an image on a focal plane including a rear focal point F as an inverted image on a vertical virtual screen disposed ahead of a lamp. The projection lens 12 according to the first exemplary embodiment is a Fresnel lens formed of a synthetic resin in which a forward surface in a plano-convex aspherical lens having a forward surface to be a convex surface and a rear surface to be a plane is formed like a step of a concentric circle. An inclination angle of each annular step portion 12*a* is set to be approximately 10 to 15 degrees (for example, 12 degrees). The projection lens 12 is supported by the annular lens holder 20, and the lens holder 20 is fixed to the bracket 22 at rear ends of a pair of left and right leg portions 20*a* extended rearward from both side portions thereof.

The light source bulb 14 may be a discharge bulb such as a metal halide bulb in which a discharging light emitting portion serves as a light source 14*a*, and the light source 14*a* may be a line light source extending along a bulb center axis Ax1. The light source bulb 14 is inserted and fixed into a bulb inserting hole 22*a* of the bracket 22 from a right side (a left side seen from a front of the lamp and so forth) on a rear side of the rear focal point F of the projection lens 12 below the optical axis Ax. The insertion and fixation is carried out so as to place a central position of the light source 14*a* (that is, a central position between ignition electrodes on the bulb center axis Ax1) under the optical axis Ax in a state in which the bulb center axis Ax1 is set to be extended in a horizontal direction in a vertical plane which is orthogonal to the optical axis Ax (that is, a state in which the bulb center axis Ax1 is set to be extended in a width direction of a vehicle).

The reflector 16 is disposed so as to cover the light source 14*a* on an upper-rear side, and is fixed to the bracket 22 in both side edge portions thereof. The reflector 16 has a reflecting surface 16*a* for reflecting a light emitted from the light source 14*a* close to the optical axis Ax in a forward direction. In the reflecting surface 16*a*, a sectional shape including a straight light connecting a central position of the light source 14*a* and the rear focal point F of the projection lens 12 is set to take an elliptical shape, and furthermore, an eccentricity thereof is set to be gradually increased from a vertical section toward a section which is inclined to both of left and right sides. As shown in FIGS. 2 and 3, consequently, the light emitted from the light source 14*a* and reflected by the reflecting surface 16*a* is almost converged in the vicinity of the rear focal point F in the vertical section, and furthermore, a converging position thereof is moved forward in a horizontal section thereof.

The shade 18 is disposed between the projection lens 12 and the reflector 16 and is fixed to the bracket 22 in both side edge portions thereof. The shade 18 is formed to take a shape of an almost circular arc along the rear focal plane of the projection lens 12 such that an upper edge 18*a* passes through the rear focal point F of the projection lens 12. Consequently, the shade 18 shields a part of the light reflected by the reflecting surface 16*a* of the reflector 16 and removes most of an upward light emitted from the projection lens 12 in a forward direction. The upper edge 18*a* of the shade 18 is formed such that a region on a left side of the optical axis Ax is extended horizontally in a leftward direction from the optical axis Ax, and a region on a right side of the optical axis Ax is extended formed obliquely downward in a rightward direction from the optical axis Ax (e.g., downward by 15 degrees) and is then extended horizontally in the rightward direction.

The first auxiliary reflector 32 is disposed below the reflector 16, and downwardly reflects the light emitted from the light source 14*a* toward a forward direction.

A sectional shape of a reflecting surface 32*a* of the first auxiliary reflector 32, taken along a vertical plane which is parallel to the optical axis Ax, has a shape of a parabola having a focal point at a light emitting center of the light source 14*a* and an axis line Ax2 downwardly extending in the forward direction at a predetermined downward inclination angle with respect to the optical axis Ax (e.g., approximately 40 degrees) as an axis thereof. The reflecting surface 32*a* is a paraboloid of revolution having the axis line Ax2 as a center axis. Consequently, the light emitted from the light source 14a is downwardly reflected in the forward direction as a parallel light having no spreading in a horizontal direction and in a vertical direction.

The first auxiliary reflector 32 is formed such that a front edge of the reflecting surface 32*a* is extended to a position placed almost under the light source 14*a* in a vertical plane including the optical axis Ax, and a pair of left and right vertical walls 32*b* are formed on respective side edge portions. The first auxiliary reflector 32 and the bracket 22 are formed in a one-piece structure.

All of the three second auxiliary reflectors 34A, 34B and 34C are disposed on a front side of the first auxiliary reflector 32, and each of the second auxiliary reflectors 34A, 34B and 34C reflect the light emitted from the light source 14*a* and reflected by the first auxiliary reflector 32 in a forward direction.

The three second auxiliary reflectors 34A, 34B and 34C are disposed at almost equal intervals in a vertical direction. The second auxiliary reflector 34A positioned at a lowermost stage and the first auxiliary reflector 32 are formed in a one-piece structure, and the other two second auxiliary reflectors 34B and 34C are fixed to the respective vertical walls 32*b* of the first auxiliary reflector 32 on both of the left and right side edge portions.

Reflecting surfaces 34Aa, 34Ba and 34Ca of the second auxiliary reflectors 34A, 34B and 34C are respectively inclined. More specifically, a sectional shape of each of the reflecting surfaces 34Aa, 34Ba and 34Ca taken along a vertical plane which is parallel to the optical axis Ax is has a shape of a straight line downwardly extending in the forward direction at a downward inclination angle which is smaller than a downward inclination angle of the axis line Ax2. A sectional shape of each of the reflecting surfaces 34Aa, 34Ba and 34Ca taken along a vertical plane which is orthogonal to the optical axis Ax has a shape of a straight line extending in a horizontal direction.

A shape of a rear edge of the reflecting surface 34Aa of the second auxiliary reflector 34A positioned at a lowermost stage has a shape of a curved line extending along the front edge of the reflecting surface 32*a* of the first auxiliary reflector 32. Shapes of rear edges of the reflecting surfaces 34Ba and 34Ca of the other two second auxiliary reflectors 34B and 34C also have the shape of the rear edge of the reflecting surface 34Aa of the second auxiliary reflector 34A. Positions of the two second auxiliary reflectors 34B and 34C in a front-and-rear direction are aligned to the position of the rear edge of the reflecting surface 34Aa of the second auxiliary reflector 34A. Consequently, the light emitted from the light source 14*a* and reflected as a parallel light, which is downwardly directed toward the forward direction, by the first auxiliary reflector 32 is also incident on all of the reflecting surfaces 34Aa, 34Ba and 34Ca of the three second auxiliary reflectors 34A, 34B and 34C. The front edges of the second auxiliary reflectors 34A, 34B and 34C are positioned almost under the projection lens 12 and are formed like a straight line in a horizontal direction.

The downward inclination angles of the reflecting surfaces 34Aa, 34Ba and 34Ca of the three second auxiliary reflectors 34A, 34B and 34C are set to have values which are a little greater than a half of the downward inclination angle of the axis line Ax2. The downward inclination angle of the reflecting surface 34Aa of the second auxiliary reflector 34A positioned at the lowermost stage is set to have a slightly greater value than a half value of the downward inclination angle of the axis line Ax2, the downward inclination angle of the reflecting surface 34Ba of the second auxiliary reflector 34B positioned at a middle stage is set to have a slightly greater value, and the downward inclination angle of the reflecting surface 34Ca of the second auxiliary reflector 34C positioned at an uppermost stage is set to have a further slightly greater value.

The downward inclination angles of the three reflecting surfaces 34Aa, 34Ba and 34Ca are delicately changed for the following reason.

As shown in FIG. 2, the light emitted from the light source 14*a* and reflected by the first auxiliary reflector 32 is incident as a parallel light on the respective second auxiliary reflectors 34A, 34B and 34C. The light reflected by the first auxiliary reflector 32 becomes a bundle of rays having spreading in a vertical direction which corresponds to a vertical width of the light source 14*a*. Therefore, the light reflected by the respective second auxiliary reflectors 34A, 34B and 34C, which regularly reflect the bundle of rays, also becomes a bundle of rays having the spreading in the vertical direction which corresponds to the vertical width of the light source 14*a*. More specifically, the light reflected by an upper region of the reflecting surface 32*a* of the first auxiliary reflector 32 becomes a bundle of rays having relatively large spreading in the vertical direction and is reflected by the second auxiliary reflector 34C positioned at the uppermost stage. Accordingly, the downward inclination angle of the reflecting surface 34Ca of the second auxiliary reflector 34C is set to have a relatively large angle. On the other hand, a light reflected by a lower region of the reflecting surface 32*a* of the first auxiliary reflector 32 becomes a bundle of rays having relatively small spreading in the vertical direction and is reflected by the second auxiliary reflector 34A positioned at a lowermost stage. Accordingly, the downward inclination angle of the reflecting surface 34Aa of the second auxiliary reflector 34A is set to have a relatively small angle. As for the second auxiliary reflector 34B positioned at a middle stage, the downward inclination angle of the reflecting surface 34Ba is set to have an intermediate value between those of the second auxiliary reflectors 34A and 24C. According to such a configuration, a position of the larger light source image formed by the light reflected by the second auxiliary reflector 34C can be downwardly displaced as compared with a position of a smaller light source image formed by the light reflected by the second auxiliary reflector 34A positioned on a lower stage side. Thus, the direction of the upper edge of the bundle of the light reflected by each of the second auxiliary reflectors 34A, 34B and 34C is set to be coincident with a direction parallel with respect to the optical axis Ax.

In the first exemplary embodiment, the second auxiliary reflector 34C positioned at the uppermost stage is formed such that both left and right regions 34CaL and 34CaR are set to have slightly smaller values of the downward inclination angles than a central region 34CaC of the reflecting surface 34Ca, whereby a light reflected by the both left and right regions 34CaL and 34CaR is reflected more upwardly than a light reflected by the central region 34CaC.

The light reflected by both the left and right regions 34CaL and 34CaR is reflected relatively upward for the following reason.

A light reflected by the upper region of the reflecting surface 32*a* of the first auxiliary reflector 32 is incident on the reflecting surface 34Ca of the second auxiliary reflector 34C which is positioned at the uppermost stage. In the upper region of the reflecting surface 32*a*, however, a difference between a distance from the light source 14*a* to a point at a central region and distances from the light source 14*a* to points at respective side regions in the horizontal direction is relatively large compared with the lower regions of the reflecting surface 32*a*. For this reason, especially with regard to a light source image formed by the light reflected by the reflecting surface 34Ca of the second auxiliary reflector 34C positioned at the uppermost stage, light source images formed by light reflected by respective side regions 34CaL and 34CaR are smaller than a light source image formed by a light reflected by the central region 34CaC. Thus, at least for the reflecting surface 34Ca of the second auxiliary reflector 34C positioned at the uppermost stage, the left and right regions 34CaL and 34CaR are formed so as to reflect light relatively upward as compared with that in the central region 34CaC, whereby the positions of the upper edges are aligned between the large light source image formed by the light reflected by the central region 34CaC and the small light source image formed by the light reflected by each of the left and right regions 34CaL and 34CaR which are positioned on both of the left and right sides.

The third auxiliary reflector 36 is disposed in front of the light source 14*a* in order to effectively utilize a light emitted toward a forward direction from the light source 14*a*. A reflecting surface 36*a* of the third auxiliary reflector 36 is a spherical surface having its center at the central position of the light source 14*a*, and reflects back the light forwardly emitted from the light source 14*a* toward the light source 14*a* and causes the light to be incident on the reflector 16 and the first auxiliary reflector 32. The third auxiliary reflector 36 and the shade 18 are formed in a one-piece structure.

The fourth auxiliary reflector 38 is disposed above the shade 18. A reflecting surface 38*a* of the fourth auxiliary reflector 38 is a spherical surface having its center at the central position of the light source 14*a*, and reflects back a light that is upwardly directed from the light source 14*a* in the forward direction and passed between the reflector 16 and the shade 18 back toward the light source 14*a*, and causes the light to be incident on the first auxiliary reflector 32. The third auxiliary reflector 36 is fixed to the reflector 16 and the bracket 22.

In a position placed almost under the projection lens 12 (that is, in the vicinity of the forward parts of the three second auxiliary reflectors 34A, 34B and 34C), the diffusion lens 40 is disposed to cover the three second auxiliary reflectors 34A, 34B and 34C and the first auxiliary reflector 32 from a forward side and is fixed to both of the vertical walls 32*b* of the first auxiliary reflector 32 in both side edge portions thereof.

A plurality of diffusion lens portions 40*s* is formed on a rear face of the diffusion lens 40 in a form of vertical stripes. By the diffusion lens portions 40*s*, a parallel light reflected regularly by each of the second auxiliary reflectors 34A, 34B and 34C is forwardly irradiated as a light to be diffused in a horizontal direction.

Figure 4:
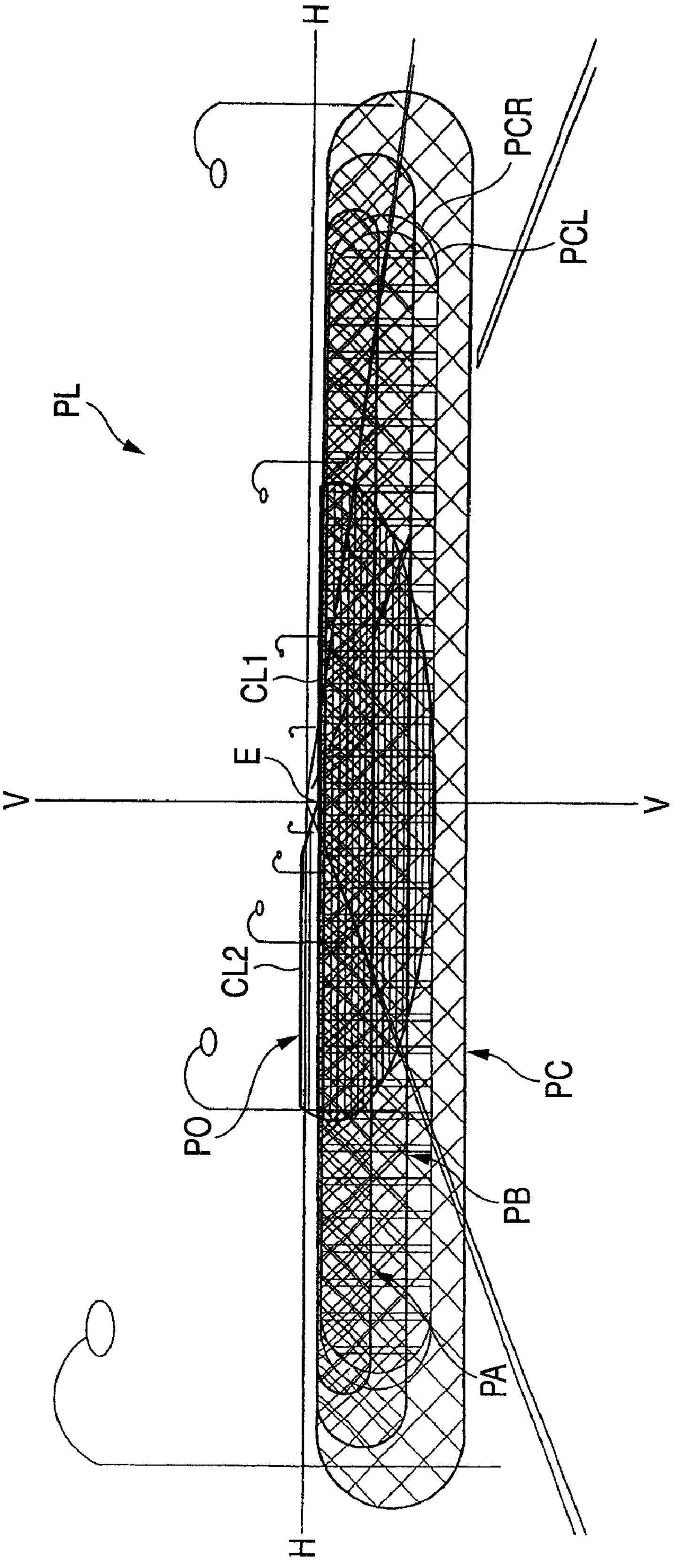
FIG. 4 is a perspective view showing a low beam light distribution pattern formed on a virtual vertical screen disposed 25 m ahead of a lamp by a light irradiated from the vehicle headlamp in a forward direction.

FIG. 4 is a perspective view showing a low beam light distribution pattern PL which is formed on a virtual vertical screen disposed 25 m ahead of a lamp by a light irradiated forward from the vehicle headlamp 10 according to the first exemplary embodiment.

The low beam light distribution pattern PL is formed as a synthetic light distribution pattern of a basic light distribution pattern P0 and three auxiliary light distribution patterns PA, PB and PC.

The basic light distribution pattern P0 is a light distribution pattern taking a basic shape of the low beam light distribution pattern PL and is formed by a light reflected by the reflector 16.

The basic light distribution pattern P0 is a low beam light distribution pattern which has a left light distribution, and has cutoff lines CL1 and CL2 at an upper edge thereof. The cutoff lines CL1 and CL2 are formed as an inverted projection image of the upper edge 18*a* of the shade 18. The cutoff line CL1 on an opposing lane side is formed to be extended horizontally and the cutoff line CL2 on a self-lane side is formed to be raised slightly upward and obliquely from an H-H line (that is, a horizontal line passing through H-V to be a vanishing point in a front direction of the lamp) at a predetermined angle (for example, 15 degrees) from the cutoff line CL1 on the opposing lane side and to be then extended horizontally.

In the basic light distribution pattern P0, an elbow point E to be an intersection point of the cutoff line CL1 on the opposing lane side and a V-V line (that is, a vertical line passing through H-V) is positioned below H-V at approximately 0.5 to 0.6 degree. The reason is that the optical axis Ax is extended in a downward direction by approximately 0.5 to 0.6 degree with respect to the longitudinal direction of the vehicle.

The basic light distribution pattern P0 is formed as a comparatively small light distribution pattern for the following reason.

In the projection lens 12 which may be a Fresnel lens, when an angle of emission from the projection lens 12 is increased, a light is easily incident on the annular step portion 12*a* on the surface at the forward side thereof. However, the annular step portion 12*a* is an optically ineffective portion. For this reason, the basic light distribution pattern P0 is set to be a comparatively small light distribution pattern such that the angle of light emission from the projection lens 12 is not increased greatly. Moreover, the projection lens 12 is formed of a synthetic resin. Therefore, in consideration of the fact that the projection lens 12 might be deformed by heat when the light reflected by the reflector 16 is converged in the vicinity of the projection lens 12, the basic light distribution pattern P0 is set to be a comparatively small light distribution pattern to converge the light reflected by the reflector 16 in a position placed apart from the projection lens 12 in a rearward direction. Consequently, a heat deformation is prevented from being generated.

The three auxiliary light distribution patterns PA, PB and PC are additionally formed to reinforce a brightness in the basic light distribution pattern P0 and diffusion regions on both of left and right sides thereof in the low beam light distribution pattern PL.

The auxiliary light distribution pattern PA is formed by the light emitted from the light source 14*a*, reflected sequentially by the first auxiliary reflector 32 and the second auxiliary reflector 34A in the lowermost stage, transmitted through the diffusion lens 40 and diffused and irradiated in the forward direction, and is formed as a horizontal light distribution pattern having a small vertical width and a much greater lateral diffusion angle than that of the basic light distribution pattern P0.

The auxiliary light distribution pattern PB is formed by the light emitted from the light source 14*a*, reflected sequentially by the first auxiliary reflector 32 and the second auxiliary reflector 34B in the middle stage, transmitted through the diffusion lens 40 and diffused and irradiated in the forward direction, and is formed as a horizontal light distribution pattern having a greater vertical width and a slightly greater lateral diffusion angle than those of the auxiliary light distribution pattern PA.

The auxiliary light distribution pattern PC is formed by the light emitted from the light source 14*a*, reflected sequentially by the first auxiliary reflector 32 and the second auxiliary reflector 34C in the uppermost stage, transmitted through the diffusion lens 40 and diffused and irradiated in the forward direction, and is formed as a horizontal light distribution pattern having a further greater vertical width and a slightly greater lateral diffusion angle than those of the auxiliary light distribution pattern PB. A part of the auxiliary light distribution pattern PC is formed by two horizontal light distribution patterns PCL and PCR. The two lateral light distribution patterns PCL and PCR are formed at slightly smaller lateral diffusion angles than the auxiliary light distribution pattern PC.

All of the three auxiliary light distribution patterns PA, PB and PC have upper edges formed to be extended in an almost horizontal direction in positions on almost the same level as the cutoff line CL1 on an opposing lane side of the basic light distribution pattern P0. The two horizontal light distribution patterns PCL and PCR forming a part of the auxiliary light distribution pattern PC also have upper edges formed to be extended in the almost horizontal direction in the positions on almost the same level as the cutoff line CL1 on the opposing lane side of the basic light distribution pattern P0.

FIG. 5 is a view for explaining a process for forming each of the auxiliary light distribution patterns PA, PB and PC by using the virtual vertical screen.

Figures 5A, 5B, 5C:
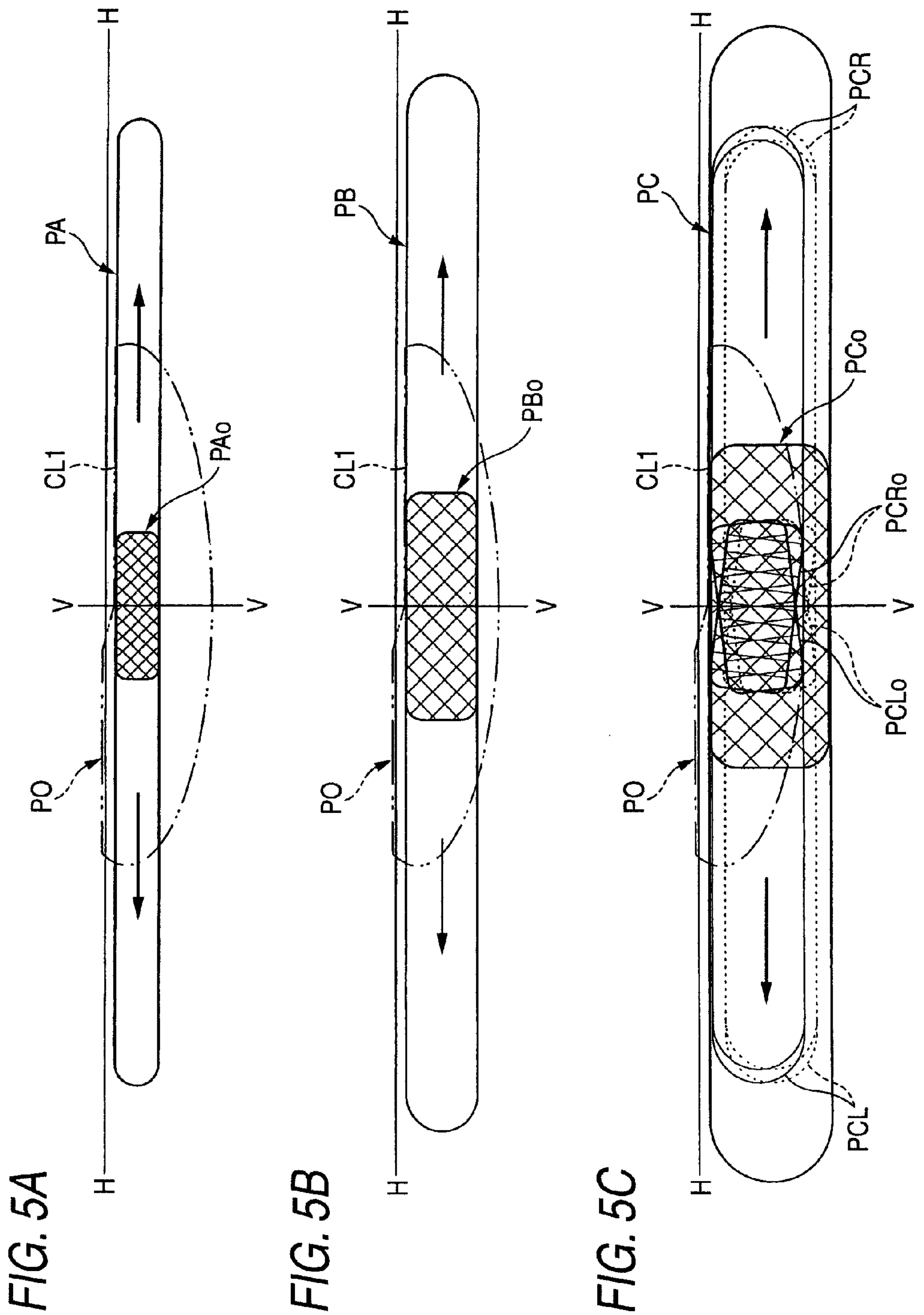
FIGS. 5A to 5C are views for explaining a process for forming three auxiliary light distribution patterns, each forming a part of the low beam light distribution pattern, by using the virtual vertical screen.

As shown in FIG. 5A, the auxiliary light distribution pattern PA is formed by diffusing the auxiliary light distribution pattern $PA_0$ toward both left and right sides. Assuming that the diffusion lens 40 is not present, the auxiliary light distribution pattern $PA_0$ is formed by the light emitted from the light source 14*a*, reflected sequentially by the first auxiliary reflector 32 and the second auxiliary reflector 34A in the lowermost stage and diffused and irradiated in the forward direction.

The auxiliary light distribution pattern $PA_0$ is formed by the light reflected by a lower region in the reflecting surface 32*a* of the first auxiliary reflector 32. All of light source images formed by lights reflected from respective points in the reflecting surface 34Aa of the second auxiliary reflector 34A are images that are close to the shape of the light source 14*a* (the horizontal line light source) and are small. Therefore, the auxiliary light distribution pattern $PA_0$ formed by the innumerable light source images also has an external shape which is horizontal, small and almost rectangular.

The upper edge of the auxiliary light distribution pattern $PA_0$ is positioned on almost the same level as the cutoff line CL1 on the opposing lane side of the basic light distribution pattern P0. The reason is that the downward inclination angle of the reflecting surface 34Aa is set such that the direction of the upper edge of the bundle of rays of the light reflected by the second auxiliary reflector 34A is coincident with a direction parallel to the optical axis Ax.

As shown in FIG. 5B, the auxiliary light distribution pattern PB is formed by diffusing the auxiliary light distribution pattern $PB_0$ toward both left and right sides. Assuming that the diffusion lens 40 is not present, the auxiliary light distribution pattern $PB_0$ is formed by the light emitted from the light source 14*a*, reflected sequentially by the first auxiliary reflector 32 and the second auxiliary reflector 34B in the middle stage and diffused and irradiated in the forward direction.

The auxiliary light distribution pattern $PB_0$ is formed by the light reflected from a central region in a vertical direction in the reflecting surface 32*a* of the first auxiliary reflector 32. All of light source images formed by lights reflected from respective points in the reflecting surface 34Ba of the second auxiliary reflector 34B are images which are comparatively close to the shape of the light source 14*a* (the horizontal line light source) and are slightly large. Therefore, the auxiliary light distribution pattern $PB_0$ formed by the innumerable light source images also has an almost rectangular external shape which is horizontal and has a larger size and a lower aspect ratio than those of the auxiliary light distribution pattern $PA_0$.

The upper edge of the auxiliary light distribution pattern $PB_0$ is positioned on almost the same level as the cutoff line CL1 on the opposing lane side of the basic light distribution pattern P0. The reason is that the downward inclination angle of the reflecting surface 34Ba is set such that the direction of the upper edge of the bundle of rays of the light reflected by the second auxiliary reflector 34B is coincident with a direction parallel to the optical axis Ax.

As shown in FIG. 5C, the auxiliary light distribution pattern PC is formed by diffusing the auxiliary light distribution pattern $PC_0$ toward both left and right sides. Assuming that the diffusion lens 40 is not present, the auxiliary light distribution pattern $PC_0$ is formed by the light emitted from the light source 14*a*, reflected sequentially by the first auxiliary reflector 32 and the second auxiliary reflector 34C in the uppermost stage and diffused and irradiated in the forward direction.

The auxiliary light distribution pattern $PC_0$ is formed by the light reflected from an upper region in the reflecting surface 32*a* of the first auxiliary reflector 32. All of light source images formed by lights reflected from respective points in the reflecting surface 34Ca of the second auxiliary reflector 34C are images which are comparatively close to the shape of the light source 14*a* (the horizontal line light source) and are large. Therefore, the auxiliary light distribution pattern $PC_0$ formed by the innumerable light source images also has an almost rectangular external shape which is horizontal and has a larger size and a lower aspect ratio than those of the auxiliary light distribution pattern $PB_0$.

The upper edge of the auxiliary light distribution pattern $PC_0$ is positioned on almost the same level as the cutoff line CL1 on the opposing lane side of the basic light distribution pattern P0. The reason is that the downward inclination angle of the reflecting surface 34Ca is set such that the direction of the upper edge of the bundle of rays of the light reflected by the second auxiliary reflector 34C is coincident with a direction parallel to the optical axis Ax.

A part of the auxiliary light distribution pattern $PC_0$ is formed by two light distribution patterns $PCL_0$ and $PCR_0$ formed by lights reflected from both of the left and right regions 34CaL and 34CaR in the reflecting surface 34Ca of the second auxiliary reflector 34C. The two light distribution patterns $PCL_0$ and $PCR_0$ are much smaller than the auxiliary light distribution pattern $PC_0$ and are inclined to a horizontal direction. The reason is as follows. More specifically, in the reflecting surface 34Ca of the second auxiliary reflector 34C on which the light reflected by the upper region in the reflecting surface 32*a* of the first auxiliary reflector 32 is incident, the light source images formed by the lights reflected from both of the left and right regions 34CaL and 34CaR are much smaller than the light source images formed by the light reflected from the central region 34CaC and the light source 14*a* (the horizontal line light source) forms an inclined image as described above.

On the assumption that the downward inclination angles of both of the left and right regions 34CaL and 34CaR are equal to the downward inclination angle of the central region 34CaC, the two light distribution patters $PCL_0$ and $PCR_0$ are formed in positions shown in a broken line in FIG. 5C. Actually, the downward inclination angles of both of the left and right regions 34CaL and 34CaR are set to have slightly smaller values than the downward inclination angle of the central region 34CaC. For this reason, the light distribution patterns $PCL_0$ and $PCR_0$ are formed in positions shown in a solid line which are correspondingly displaced in an upward direction. The two light distribution patterns $PCL_0$ and $PCR_0$ are diffused in a horizontal direction by means of the diffusion lens 40 so that two lateral light distribution patterns PCL and PCR having upper edges positioned on almost the same level as the cutoff line CL1 on the opposing lane side of the basic light distribution pattern P0 are formed as shown in a solid line in place of the broken line in FIG. 5C.

As described above in detail, the projector-type vehicle headlamp 10 according to the first exemplary embodiment has the shade 18 and the light source 14*a* which is a line light source extending in the width direction of the vehicle. Therefore, it is possible to easily have a lamp structure in which the light source bulb 14 is inserted and fixed into the reflector 16 from the side thereof. Consequently, it is possible to reduce the size of the lamp in a front-and-rear direction, thereby causing the lamp to be compact.

In the vehicle headlamp 10 according to the first exemplary embodiment, the first auxiliary reflector 32 which downwardly reflects the light emitted from the light source 14*a* in the forward direction is disposed below the reflector 16, and a plurality of (three according to the first exemplary embodiment) second auxiliary reflectors 34A, 34B and 34C, which forwardly reflect the light emitted from the light source 14*a* and reflected by the first auxiliary reflector 32, are disposed on a front side of the first auxiliary reflector 32. Therefore, it is possible to form the low beam light distribution pattern PL as a synthetic light distribution pattern in which the auxiliary light distribution patterns PA, PB and PC formed by the lights irradiated from the first auxiliary reflector 32 and the three second auxiliary reflectors 34A, 34B and 34C are superposed on the basic light distribution pattern P0 formed by the light irradiated through the reflector 16 and the projection lens 12. Consequently, it is possible to increase a luminous flux utilization ratio to the light emitted from the light source 14*a*, thereby maintaining the brightness of the low beam light distribution pattern PL sufficiently.

In the vehicle headlamp 10 according to the first exemplary embodiment, the sectional shape of the reflecting surface 32*a* of the first auxiliary reflector 32 taken along the vertical plane which is parallel to the optical axis Ax in is has a shape of a parabola having its focal point at the center of the light source 14*a* and the axis line Ax2 downwardly extending in the forward direction at a predetermined downward inclination angle with respect to the optical axis Ax as its axis. Therefore, the light emitted from the light source 14*a* and reflected by the first auxiliary reflector 32 becomes the parallel light which is downwardly directed in the forward direction in the vertical plane. The light source 14*a*, which is a line light source extending in the width direction of the vehicle, is an almost point light source in the vertical plane that is parallel to the optical axis Ax. Therefore, the light emitted from the light source 14*a* and reflected by the first auxiliary reflector 32 is incident as a parallel light which rarely has spreading in the vertical direction on each of the three second auxiliary reflectors 34A, 34B and 34C disposed at a predetermined interval in the vertical direction.

In the second auxiliary reflectors 34A, 34B and 34C, the sectional shapes of the reflecting surface 34Aa, 34Ba and 34Ca taken along the vertical planes have the shape of the straight line downwardly extending in the forward direction at a smaller downward inclination angle than the predetermined downward inclination angle. Therefore, the light emitted from the light source 14*a* and reflected by the first auxiliary reflector 32 is regularly reflected by the second auxiliary reflectors 34A, 34B and 34C, and is forward irradiated as a parallel light which rarely has spreading in the vertical direction.

The light emitted from the light source 14*a* is changed into the parallel light through the first auxiliary reflector 32 and is regularly reflected by the second auxiliary reflectors 34A, 34B and 34C in the vertical plane which is parallel to the optical axis Ax. Consequently, it is possible to finely control the lights reflected by the first auxiliary reflector 32 and the second auxiliary reflectors 34A, 34B and 34C. More specifically, by properly setting the downward inclination angles of the reflecting surfaces of the second auxiliary reflectors 34A, 34B and 34C, it is possible to form the auxiliary light distribution patterns PA, PB and PC along the cutoff line CL1 on the opposing lane side of the basic light distribution pattern P0.

When a combination of the first auxiliary reflector 32 and the second auxiliary reflectors 34A, 34B and 34C irradiate the light emitted from the light source 14*a* as the diffusion light, which is diffused in the horizontal direction, it is possible to form the auxiliary light distribution pattern PA, PB and PC as the horizontal light distribution patterns. On the other hand, when the first auxiliary reflector 32 and the second auxiliary reflectors 34A, 34B and 34C forwardly irradiate the light emitted from the light source 14*a* as an almost parallel light which is not diffused in the horizontal direction, it is possible to form the auxiliary light distribution pattern PA, PB and PC as collected light distribution patterns.

According to the first exemplary embodiment, the diffusion lens 40, which diffuses the light reflected by the three second auxiliary reflectors 34A, 34B and 34C in the horizontal direction, is disposed on a front side of the second auxiliary reflectors 34A, 34B and 34C. Thus, even if the first auxiliary reflector 32 and the second auxiliary reflectors 34A, 34B and 34C do not have a light diffusing function in the horizontal direction, it is possible to form the horizontal auxiliary light distribution patterns PA, PB and PC. Consequently, it is possible to easily form the reflecting surface 32*a* of the first auxiliary reflector 32 and the reflecting surfaces 34Aa, 34Ba and 34Ca of the second auxiliary reflectors 34A, 34B and 34C with high precision.

According to the first exemplary embodiment, it is possible to reduce the size of the lamp in the front-and-rear direction, and the projector-type vehicle headlamp 10 forms the bright low beam light distribution pattern PL with high precision.

In addition, in the vehicle headlamp 10 according to the first exemplary embodiment, the light that is forwardly emitted from the light source 14*a* is reflected back toward the light source 14*a* by the third auxiliary reflector 36, and becomes incident on the reflector 16 and the first auxiliary reflector 32. The light forwardly emitted from the light source 14*a* is reflected back toward the light source 14*a* by the fourth auxiliary reflector 38 and becomes incident on the first auxiliary reflector 32. Therefore, it is possible to correspondingly increase the brightness of each of the basic light distribution pattern P0 and the auxiliary light distribution patterns PA, PB and PC. Consequently, the low beam light distribution pattern PL can be made brighter.

In the vehicle headlamp 10 according to the first exemplary embodiment, the projection lens 12 may be a Fresnel lens. Therefore, it is possible to reduce the thickness of the projection lens 12. Consequently, it is possible to promote a reduction in the size of the lamp in a front-and-rear direction still more. In a case in which is a Fresnel lens is employed as the projection lens 12, the annular step portion 12*a* is an optically ineffective portion. Therefore, it is difficult to form the basic light distribution pattern having a large diffusion. In addition, in the projection lens 12 formed of a synthetic resin according to the first exemplary embodiment, it is difficult to form the basic light distribution pattern having the large diffusion also in respect of a prevention of heat deformation. Therefore, it is particularly effective to form the horizontal auxiliary light distribution patterns PA, PB and PC along the cutoff line CL1 on the opposing lane side of the basic light distribution pattern P0. More specifically, the auxiliary light distribution patterns PA, PB and PC are formed such that the upper edges are extended on almost the same level as the cutoff line CL1 on the opposing lane side at both of the left and right sides of the basic light distribution pattern P0. Consequently, it is possible to enhance a distance of visibility on both of the left and right sides of the forward road surface of the vehicle, thereby improving a running safety in a turning operation.

In the vehicle headlamp 10 according to the first exemplary embodiment, the reflecting surface 32*a* of the first auxiliary reflector 32 is formed in a shape of a paraboloid of revolution having the axis line Ax2 as its center axis. Therefore, the light reflected by the first auxiliary reflector 32 is a parallel light having no spreading in the horizontal direction and in the vertical direction. The reflecting surfaces 34Aa, 34Ba and 34Ca of the second auxiliary reflectors 34A, 34B and 34C are flat. Therefore, the light reflected by the first auxiliary reflector 32 can be directly reflected regularly as a parallel light by each of the second auxiliary reflectors 34A, 34B and 34C. Consequently, it is possible to easily carry out a design of a light distribution with high precision.

In addition, regarding the downward inclination angles of the straight lines forming the sectional shapes of the reflecting surfaces 34Aa, 34Ba and 34Ca of the three second auxiliary reflectors 34A, 34B and 34C taken along the vertical planes, the downward inclination angle of the reflecting surface 34Ca of the second auxiliary reflector 34C positioned at the uppermost stage is greater than that of the reflecting surface 34Ba of the second auxiliary reflector 34B positioned at the middle stage, and the downward inclination angle of the reflecting surface 34Ba of the second auxiliary reflector 34B positioned at the middle stage is greater than that of the reflecting surface 34Aa of the second auxiliary reflector 34A positioned at the lowermost stage. Therefore, it is possible to align the positions of the upper edges of the auxiliary light distribution patterns PA, PB and PC formed by the lights reflected from the second auxiliary reflectors 34A, 34B and 34C. Consequently, a synthetic light distribution pattern of the three auxiliary light distribution patterns PA, PB and PC can be formed as a light distribution pattern having a high contrast in an upper edge.

In the first exemplary embodiment, the reflecting surface 34Ca of the second auxiliary reflector 34C positioned at the uppermost stage is formed such that the light from the first auxiliary reflector 32 is reflected relatively upward on the left and right regions 34CaL and 34CaR positioned on the respective sides of the central region 34CaC in the right-and-left direction. Therefore, it is possible to align the positions of the upper edges of the large light source image formed by the light reflected from the central region 34CaC and the small light source image formed by the light reflected from each of the left and right regions 34CaL and 34CaR. Consequently, the auxiliary light distribution pattern PC formed by the light reflected from the second auxiliary reflector 34C can be formed as a light distribution pattern having a high contrast in the upper edge.

While description has been given on the assumption that the reflecting surfaces 34Aa, 34Ba and 34Ca of the second auxiliary reflectors 34A, 34B and 34C are flat surfaces in the first exemplary embodiment, each of the reflecting surfaces 34Aa, 34Ba and 34Ca may be a curved surface in which a downward inclination angle is gradually increased from a rear edge toward a front edge. In such a case, it is possible to obtain the following functions and advantages. More specifically, the spreading in the vertical direction of the bundle of rays of the reflected light is slightly different between the vicinal regions of the rear edges and those of the front edges of the reflecting surfaces 34Aa, 34Ba and 34Ca. Therefore, it is possible to increase the contrast of the upper edge of the auxiliary light distribution pattern PC still more by forming the reflecting surfaces 34Aa, 34Ba and 34Ca as the curved surfaces to cause the direction of the upper edge of the bundle of rays of the light reflected by respective points on the reflecting surfaces 34Aa, 34Ba and 34Ca to be coincident with a direction parallel to the optical axis Ax. In such a case, a degree of a curvature of the curved surface is very low and a sectional shape taken along a vertical plane which is parallel to the optical axis Ax of each of the reflecting surfaces 34Aa, 34Ba and 34Ca can be maintained to be a shape of an almost straight line downwardly extending in the forward direction at a downward inclination angle which is a little greater than a half of the downward inclination angle of the axis line Ax2.

Next, description will be given to a second exemplary embodiment.

Figure 6:
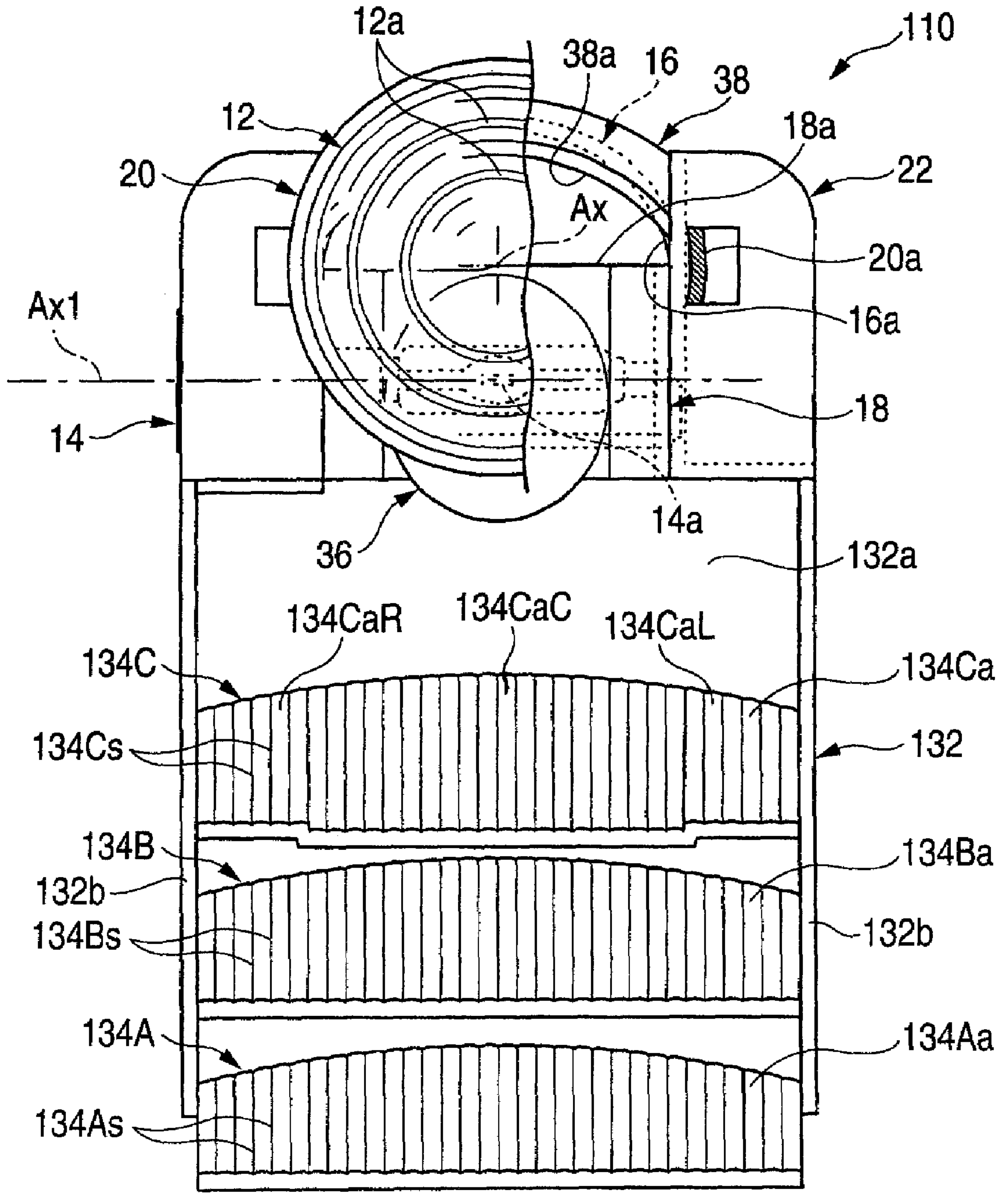
FIG. 6 is a front view illustrating a second exemplary embodiment.

FIG. 6 illustrates a vehicle headlamp 110 according to the second exemplary embodiment.

As shown in the drawing, the vehicle headlamp 110 according to the second exemplary embodiment has a basic structure which is the same as that of the vehicle headlamp 10 according to the first exemplary embodiment. However, the diffusion lens 40 according to the first exemplary embodiment is not disposed, and furthermore, structures of a first auxiliary reflector 132 and three second auxiliary reflectors 134A, 134B and 134C are different from those of the first exemplary embodiment.

More specifically, the second auxiliary reflectors 134A, 134B and 134C according to the second exemplary embodiment are disposed in front of the first auxiliary reflector 132 in the same manner as the second auxiliary reflectors 34A, 34B and 34C of the first exemplary embodiment, and forwardly reflects a light emitted from a light source 14*a* and reflected by the first auxiliary reflector 132. Reflecting surfaces 134Aa, 134Ba and 134Ca of the second auxiliary reflectors 134A, 134B and 134C are inclined flat surfaces having downward inclination angles which are equal to those of the reflecting surfaces 34Aa, 34Ba and 34Ca of the second auxiliary reflectors 34A, 34B and 34C according to the first exemplary embodiment.

A plurality of diffuse reflecting portions 134As, 134Bs and 134Cs, which reflects a light reflected by the first auxiliary reflector 132 and diffuses the light in a horizontal direction, is formed in shapes of vertical stripes on the respective reflecting surfaces 134Aa, 134Ba and 134Ca of the second auxiliary reflectors 134A, 134B and 134C.

Also in the second exemplary embodiment, the second auxiliary reflector 134A positioned at the lowermost stage and the first auxiliary reflector 132 are formed in a one-piece structure, and the other two second auxiliary reflectors 134B and 134C are fixed to respective vertical walls 132*b* of the first auxiliary reflector 132 in both of left and right side edge portions.

Both of the vertical walls 132*b* of the first auxiliary reflector 132 are set to have a smaller longitudinal length than both of the vertical walls 32*b* of the first auxiliary reflector 32 of the first exemplary embodiment in order to prevent a light diffused and reflected by each of the reflecting surfaces 134Aa, 134Ba and 134Ca from being shielded as greatly as possible. The structure of the reflecting surface 132Aa of the first auxiliary reflector 132 is entirely the same as that of the reflecting surface 32Aa of the first auxiliary reflector 32 according to the first exemplary embodiment.

Also in the case in which the vehicle headlamp 110 according to the second exemplary embodiment is employed, it is possible to form a low beam light distribution pattern which is almost the same as the low beam light distribution pattern PL which is formed by the vehicle headlamp 10 according to the first exemplary embodiment. In addition, in the vehicle headlamp 110 according to the second exemplary embodiment, it is possible to eliminate the diffusion lens 40.

While the description has been given on the assumption that the three second auxiliary reflectors 34A, 34B and 34C (or 134A, 134B and 134C) are disposed at almost equal intervals in the vertical direction in the exemplary embodiments, the intervals can also be set to be non-equal and the number of the second auxiliary reflectors to be disposed can also be set to be two or at least four.

In the exemplary embodiments, description has been given on the assumption that the light source 14*a* is disposed below the optical axis Ax. As a matter of course, it is also possible to employ a structure in which the light source 14*a* is disposed on the same level as the optical axis Ax.

The numeric values indicated as data in the exemplary embodiments are only illustrative and it is a matter of course that they can be properly set to be different values.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A vehicle headlamp comprising:

a projection lens disposed on an optical axis extending in a longitudinal direction of a vehicle;

a light source disposed on a rear side of a rear focal point of the projection lens;

a reflector which forwardly reflects a light emitted from the light source toward the optical axis;

a shade disposed such that an upper edge of the shade is positioned in the vicinity of the optical axis near the rear focal point, wherein the shade shields a part of the light reflected by the reflector, and forms a cutoff line of a low beam light distribution pattern;

a first auxiliary reflector which is disposed below the reflector, and downwardly reflects the light emitted from the light source in a forward direction; and a plurality of second auxiliary reflectors which is disposed on a front side of the first auxiliary reflector at a predetermined interval along a vertical direction, and forwardly reflects the light reflected by the first auxiliary reflector, wherein the light source is a line light source extending in a width direction of the vehicle, a sectional shape of a reflecting surface of the first auxiliary reflector taken along a vertical plane that is parallel to the optical axis is a shape of a parabola, the parabola having a focal point in the vicinity of the light source and an axis line downwardly extending in the forward direction at a predetermined downward inclination angle with respect to the optical axis, and a sectional shape of a reflecting surface of each of the second auxiliary reflectors taken along the vertical plane has a shape of a substantially straight line downwardly extending in the forward direction at a downward inclination angle which is smaller than the predetermined downward inclination angle.

2. The vehicle headlamp according to claim 1, wherein the projection lens is a Fresnel lens.

3. The vehicle headlamp according to claim 1, wherein the reflecting surface of the first auxiliary reflector is formed in a shape of a paraboloid of revolution having the axis line downwardly extending in the forward direction as a center axis thereof, and the reflecting surface of each of the second auxiliary reflectors is flat.

4. The vehicle headlamp according to claims 1, wherein the sectional shape of the reflecting surface of the second auxiliary reflector disposed on an upper side has a larger downward inclination angle than the sectional shape of the reflecting surface of the second auxiliary reflector disposed on a lower side.

5. The vehicle headlamp according to claim 1, wherein the reflecting surface of at least the second auxiliary reflector disposed on an uppermost side is formed such that the light reflected by the first auxiliary reflector is reflected more upwardly on respective side regions in the width direction of the vehicle relative to a central region.

6. The vehicle headlamp according to claim 1, further comprising a diffusion lens disposed on a front side of the second auxiliary reflectors and which diffuses the light reflected by the second auxiliary reflectors in the width direction of the vehicle.

7. The vehicle headlamp according to claim 1, wherein the light source is disposed below the optical axis.

8. The vehicle headlamp according to claim 1, wherein the plurality of second auxiliary reflectors are disposed at equal intervals along the vertical direction.

9. The vehicle headlamp according to claim 1, wherein the downward inclination angle of the substantially straight line downwardly extending in the forward direction is greater than one-half of the predetermined downward inclination angle.

10. The vehicle headlamp according to claim 1, wherein each of the second auxiliary reflectors includes a plurality of diffuse reflecting portions, wherein each of the diffuse reflecting portions reflects the light reflected by the first auxiliary reflector and diffuses the light in the width direction of the vehicle.

* * * * *